United States Patent
Bixler et al.

(10) Patent No.: US 6,212,559 B1
(45) Date of Patent: Apr. 3, 2001

(54) AUTOMATED CONFIGURATION OF INTERNET-LIKE COMPUTER NETWORKS

(75) Inventors: David C. Bixler, Hermosa Beach; Eufemia P. Hilger, Torrance, both of CA (US); Jeffrey A. Smith, Albuquerque, NM (US); Mark R. Wittlin, Hermosa Beach; Neil G. Siegel, Rancho Palos Verdes, both of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/181,371

(22) Filed: Oct. 28, 1998

(51) Int. Cl.[7] .................................................. G06F 15/177
(52) U.S. Cl. ......................... 709/221; 709/220; 709/223; 709/227; 709/236; 709/242
(58) Field of Search ..................................... 709/204–205, 709/220–224, 227–228, 238–242; 345/333–334, 356, 969

(56) References Cited

U.S. PATENT DOCUMENTS

| | | | |
|---|---|---|---|
| 5,751,967 | * 5/1998 | Raab et al. | 709/228 |
| 5,774,689 | * 6/1998 | Curtis et al. | 709/205 |
| 5,838,907 | * 11/1998 | Hansen | 709/220 |
| 5,889,954 | 3/1999 | Gessel et al. | 709/223 |
| 5,913,921 | * 6/1999 | Tosey et al. | 709/220 |
| 5,983,269 | * 11/1999 | Mattson et al. | 709/221 |
| 6,003,075 | * 12/1999 | Arendt et al. | 709/221 |
| 6,012,088 | * 1/2000 | Li et al. | 709/220 |
| 6,085,238 | * 7/2000 | Yuasa et al. | 709/223 |

FOREIGN PATENT DOCUMENTS

| | | | |
|---|---|---|---|
| 0797330 | 9/1997 | (EP) | H04L/12/24 |
| 0889656 | 1/1999 | (EP) | H04L/12/24 |

OTHER PUBLICATIONS

Dynamic LAN Reconfiguration Mechanism, IBM Technical Disclosure Bulletin vol. 37, No. 11, Nov. 1994, p. 407–410.
Intelligent Resource Dimensioning In ATM Networks, ISS Symposium, Apr. 23, 1995, vol. 2.

* cited by examiner

Primary Examiner—Meng-Ai T. An
Assistant Examiner—Bharat Barot
(74) Attorney, Agent, or Firm—Michael S. Yatsko

(57) ABSTRACT

A system and corresponding method of its operation, for configuring a communication network of multiple interconnected computers. The system includes a graphical user interface (36) that facilitates the functions of task organization development (38), platform equipment development (40), address book development (60) and logical network development (42) in a simulated planning phase of operation (30). Using the system, an authorized user performs these development functions to define one or more logical communication networks, and then the system automatically generates specifications for a corresponding physical communication network (44), including management information blocks (74). In a dissemination phase of operation (32), the management information blocks are transmitted (50) to the network computers. In an execution phase of operation (34), the received management information blocks are used to condition (52) the network computers to switch to the new configuration upon receipt of a timing or command signal, when the computers all switch to a new configuration (54) at the same time.

16 Claims, 19 Drawing Sheets

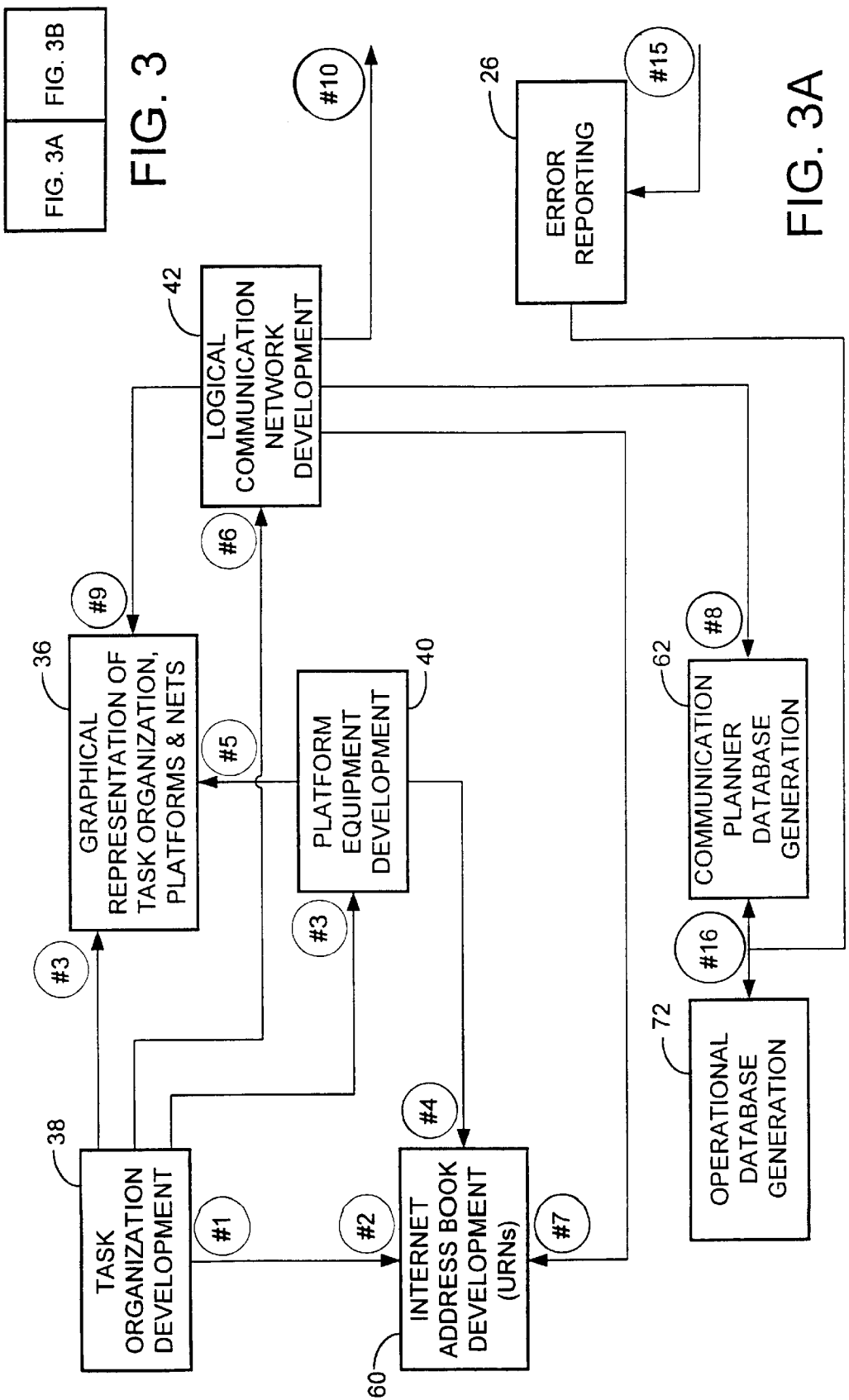

AUTOMATED CONFIGURATION OF INTERNET-LIKE COMPUTER NETWORKS

This invention was made with Government support under contract number DAAB07-95-D-E604 awarded by the Department of the Army. The Government has certain rights in this invention.

BACKGROUND OF THE INVENTION

This invention relates generally to computer networks and, more particularly, to techniques for configuring large interconnected networks to enable proper routing of messages to their intended destinations. The interconnection of many local area networks (LANs) and larger networks, sometimes referred to as wide area networks (WANs), is now a relatively well understood concept in most business, educational and government organizations. Computers may be interconnected through telephone lines, coaxial cables, optical fibers, radio or microwave communication links, earth-orbiting satellites, or other means.

In a large interconnected computer network, such as the Internet, computers may be categorized by the principal functions they perform. For example, there are user computers that function as network nodes or stations, sometimes referred to as host computers, which send and receive messages over a network in the form of packets of data. Other computers function as servers, and distribute requested data to network users with host computers. Computers in another category function solely to route data packets or messages from one part of the network to another. These are known by various names suggestive of the specific functions they perform, such as bridges, routers, switches and gateways. A bridge is a device that is connected to at least two LANs and serves to pass message frames or packets between the LANs, such that a source station on one LAN can transmit data to a destination station on another LAN without concern for the location of the destination. A bridge "listens" to messages from every LAN to which it is connected and relays the message onto all the other LANs to which it is connected. Routers perform an analogous function but make use of a network identifier in a message destination address to determine an optimum path for the message.

Every network station or node has both a physical address and a logical address. The physical address is a unique numerical or other code that uniquely defines the station and the local network to which it is connected. The logical address is usually a name or label associated with the station or the person using it. The logical address, which may include a person's name, is the address other users employ to direct messages to the person without having to remember or look up a long and complicated physical address.

In any large organization with many interconnected computers, whether it be a business, educational or military organization, proper routing of data messages from one network station to another depends largely on having the network accurately configured. That is to say, each network station or host must have its hardware address properly set up and each router or other message routing computer must be properly programmed to reflect exactly the physical locations of the stations in the network, the relationships between the physical and logical addresses, and the interconnection paths between all the computers and interconnected LANs in the network. This configuration process is conventionally performed manually, typically by technicians or system administrative personnel.

As interconnected networks become more complex, it also becomes more difficult to ensure that every network component has been correctly configured. The principal reason that manual network configuration is tolerated in large organizations is that in many cases the network configuration is relatively static, and the required changes are small and incremental. When a new employee joins the network or changes physical locations, it is a relatively simple matter to reconfigure the network to include his or her computer in the appropriate new location. Extensive corporate reorganizations are typically infrequent and there is usually adequate warning to make the necessary configuration changes.

A more difficult problem is presented when frequent changes are needed in the network configuration. One example is a military communication network in which many of the computer stations are mobile and reconfiguration may be needed on a daily or even more frequent basis during military maneuvers. In this case, there is simply not enough time for manual reconfiguration of a large interconnected network of computers.

Accordingly, there is a significant need for an automated process to reconfigure large computer networks, such as wireless military networks. Even in a commercial setting where there is usually enough time to reconfigure networks when changes occur, there is a need for a technique that would effect network reconfiguration more quickly and reliably than by manual means. The present invention satisfies this need and provides a number of other related advantages.

SUMMARY OF THE INVENTION

The present invention resides in a system and a related method for automatically configuring or reconfiguring a large interconnected computer network under control of a user with appropriate system administration access to the network. Briefly, and in general terms, the method of the invention comprises the steps of planning a network configuration in simulated form through a graphical user interface; generating network programming data corresponding to a new configuration arrived at in the planning step; disseminating the network programming data over an existing communication network; conditioning computers in the network to switch to the new configuration on the occurrence of a triggering signal; and switching to the new configuration upon occurrence of the triggering signal.

In one embodiment of the invention, the triggering signal is generated by a clock in each computer and the conditioning step conditions the network computers to switch to the new configuration at a prearranged time. Alternatively, the triggering signal is generated by a command transmitted to the network computers over the network.

More specifically, the planning step includes specifying a task organization that defines functional interrelationships between users of network computer stations; specifying a platform equipment definition for each network computer station; specifying at least one logical network configuration that defines the interrelationships between network computer stations; automatically converting each logical network configuration to a corresponding physical network configuration; and automatically generating from the physical network configuration a network operational database that completely defines the network and a plurality of management information blocks containing data to be used to program message routing computers in the network. The disseminating step includes transmitting the management information blocks over the network to message routing computers to which the blocks pertain. The conditioning step is then performed in each message routing computer in response to receipt of a management information block.

The method may further comprise the step of generating reports pertaining to the task organization, platform equipment, and logical network configuration defined in the specifying steps, and pertaining to the physical network configuration.

The planning step may further include the step of developing an Internet address book from the data generated during the specifying steps.

In accordance with another feature of the invention, the planning step further includes automatically detecting any errors made in the specifying steps; reporting any detected errors; and repeating the specifying steps until any detected and reported errors are eliminated.

The invention may also be defined as a system for configuring a communication network of multiple interconnected computers, some of which perform a message routing function. In its broadest terms, the system comprises a graphical user interface module facilitating specification of a network by an authorized user; a network planning module, coupled to the graphical user interface module and functioning to allow the authorized user to define various aspects of a network of computers; means for generating network programming data corresponding to a new configuration specified in the network planning module; means for disseminating the network programming data over an existing communication network; means for conditioning computers in the network to switch to the new configuration on the occurrence of a triggering signal; and means for switching to the new configuration upon occurrence of the triggering signal.

In accordance with one alternative, the triggering signal is generated by a clock in each computer and the means for conditioning conditions the network computers to switch to the new configuration at a prearranged time. In an alternative approach, the means for switching includes means for generating a triggering signal that is transmitted to the network computers over the network.

More specifically, the network planning module includes a task organization development module coupled to the graphical user interface and functioning to allow the authorized user to define functional interrelationships between users of network computer stations; a platform equipment development module coupled to the graphical user interface and functioning to allow the authorized user to define equipment parameters for each network computer station; a logical communication network development module coupled to the graphical user interface and functioning to allow the authorized user to specify at least one logical network configuration that defines the interrelationships between network computer stations; means for automatically converting each logical network configuration to a corresponding physical network configuration; and means for automatically generating from the physical network configuration a network operational database that completely defines the network and a plurality of management information blocks containing data to be used to program message routing computers in the network.

Further, the means for disseminating includes means for transmitting the management information blocks over the network to message routing computers to which the blocks pertain, and the means for conditioning is located in each message routing computer and operates in response to receipt of a management information block.

The system may further comprise means for generating reports pertaining to the task organization, platform equipment, and logical network configuration defined in the development modules, and pertaining to the means for automatically generating a physical network configuration.

The network planning module may further include an Internet address book development module using data generated in the task organization development module, the platform equipment development module and the logical communication network development module.

The network planning module may further include means for automatically detecting any errors made in the development modules; means for reporting any detected errors; and means for repeatedly operating the development modules until any detected and reported errors are eliminated.

It will be appreciated from the foregoing that the present invention represents a significant advance in the field of communication networks. In particular the invention provides a technique that facilitates user specification of network configuration changes, and then automatically converts the user's specifications to a new physical network configuration. Then, under user control, the system of the invention transmits configuration changes to all affected computers in the network, which are automatically conditioned to switch to a new configuration at a prearranged time or upon the receipt of a command signal. Other aspects and advantages of the invention will become apparent from the following more detailed description, taken in conjunction with the accompanying drawings.

BRIEF DESCRIPTION OF THE DRAWINGS

FIGS. 3A and 3B together comprise a block diagram depicting process flow in the planning phase of operation of the network configuration tool;

DESCRIPTION OF THE PREFERRED EMBODIMENT

Figure 1:
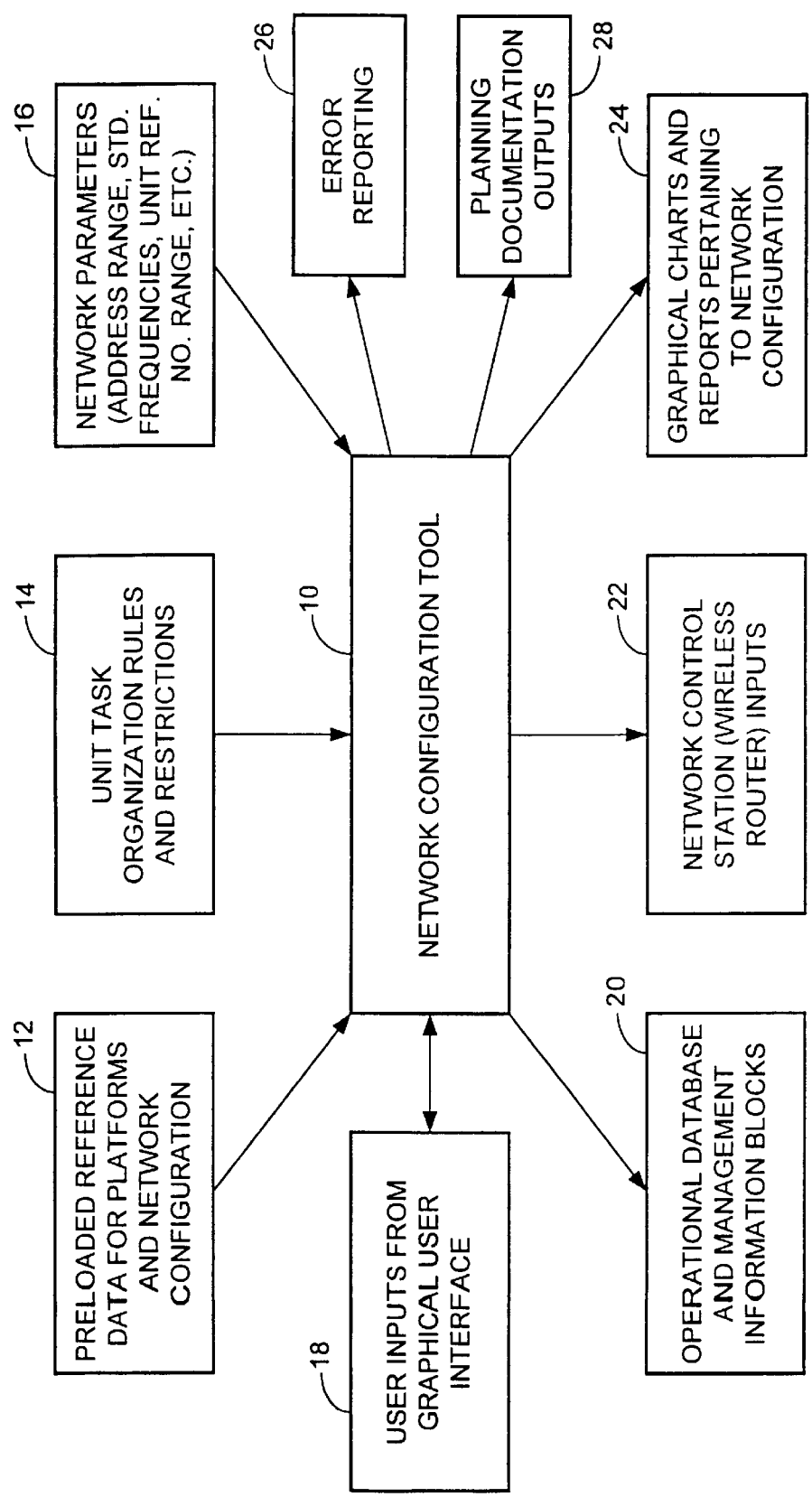
FIG. 1 is a block diagram showing inputs to and outputs from a network configuration tool in accordance with the present invention.

As shown in the drawings for purposes of illustration, the present invention pertains to techniques for configuring or reconfiguring a large network of interconnected computers. Computer networks must be accurately programmed to reflect the locations and identities of all of its components and the topology of its interconnections. Conventionally, various items of configuration data are entered manually into each computer. Not only is this time consuming and subject to error, but rapid reconfiguration to reflect changes in location, identity or network topology may not be readily achievable to meet user requirements in some networks.

In accordance with the present invention, a network administrator can configure or reconfigure the network from a host computer connected to the network, using a graphical interface to specify logical and topographical relationships among network computers and their users. The network configuration tool then generates all the necessary parameters of a corresponding logical communication network and a physical communication network. Under control of the network administrator, new network parameters are disseminated to the various computers in the network, all of which are instructed to switch to the new parameters at a common prearranged time, or when a single command signal is received.

FIG. 1 shows the principle input and output data items pertaining to the network configuration tool 10 of the present invention. First the configuration tool 10 uses preloaded reference data for network configuration and platforms, as indicated in block 12. In this specification, the term "platform" is used to define the working environment of a network computer. In some contexts, where network computers are portable, the "platform" data may pertain to a vehicle, such as an automobile, an armored tank, a ship or an aircraft. In the context of conventional desk-top computers, the "platform" data may define the computer location in terms of a building and room identification.

Another major type of network configuration tool inputs is a set of unit task organization rules and restrictions, as indicated in block 14. A "unit" is a single entity in an organizational structure. The "unit task organization" is the overall organization plan by which units are grouped and interrelated according to the tasks they perform. In a military organization, units may include such entities as divisions, brigades, companies, fleets, ships, aircraft groups and so forth. In a business context, units include such entities as corporations, groups, sectors, divisions, branches, departments, and individuals with various job titles. Similarly, organizational units with other appropriate names are used in governmental and educational organizations.

Every unit task organization has its own particular rules and restrictions pertaining to how the units may be interrelated. For example, a corporation president would not report to a department manager. The network configuration tool 10 allows a specially authorized user to configure or reconfigure a computer network, but only within the organization rules and restrictions input from block 14.

A third general category of inputs to the network configuration tool 10 encompasses network parameters, as indicated in block 16. These are physical parameters of the network, such as station address ranges, standard transmission frequencies for wireless networks, an acceptable range of unit reference numbers, and so forth. The configuration tool 10 needs to have this information when assigning news units to or moving existing units in a network.

An important fourth category of inputs comes from a user of the network configuration tool 10, through a graphical interface, as indicated in block 18. The user supplies input data and commands pertaining to the configuration changes that are being requested. Changes in task organization units, platform assignments and logical communication networks are input through the graphical interface. The user interface is interactive, with the user receiving error messages if, for example the requested changes are contrary to the unit task organization rules and restrictions, and receiving confirmation if the requested changes are accepted.

The network configuration tool 10 generates a new or modified operational database that reflects all the changes made by the user and also outputs management information blocks, as indicated in block 20. The management information blocks contain data for reconfiguring individual computers in the network in accordance with the new configuration. The blocks are in a standard format that enables them to be transmitted to and implemented by computers in the network.

For networks employing wireless routers, the network configuration tool 10 also outputs network control station input data in a standard format for transmission to wireless routers, as indicated in block 22. Finally, the network configuration tool 10 is capable of generating a variety of graphical charts and reports pertaining to the reconfigured network configuration, as indicated in block 24.

In addition to the functions described above, the network configuration tool 10 also performs an error reporting function, as indicated in block 26, which is further discussed below with reference to FIG. 3A. The network configuration tool 10 also provides planning documentation outputs, as indicated in block 28, which is further discussed below with reference to FIG. 3B.

Figure 2:
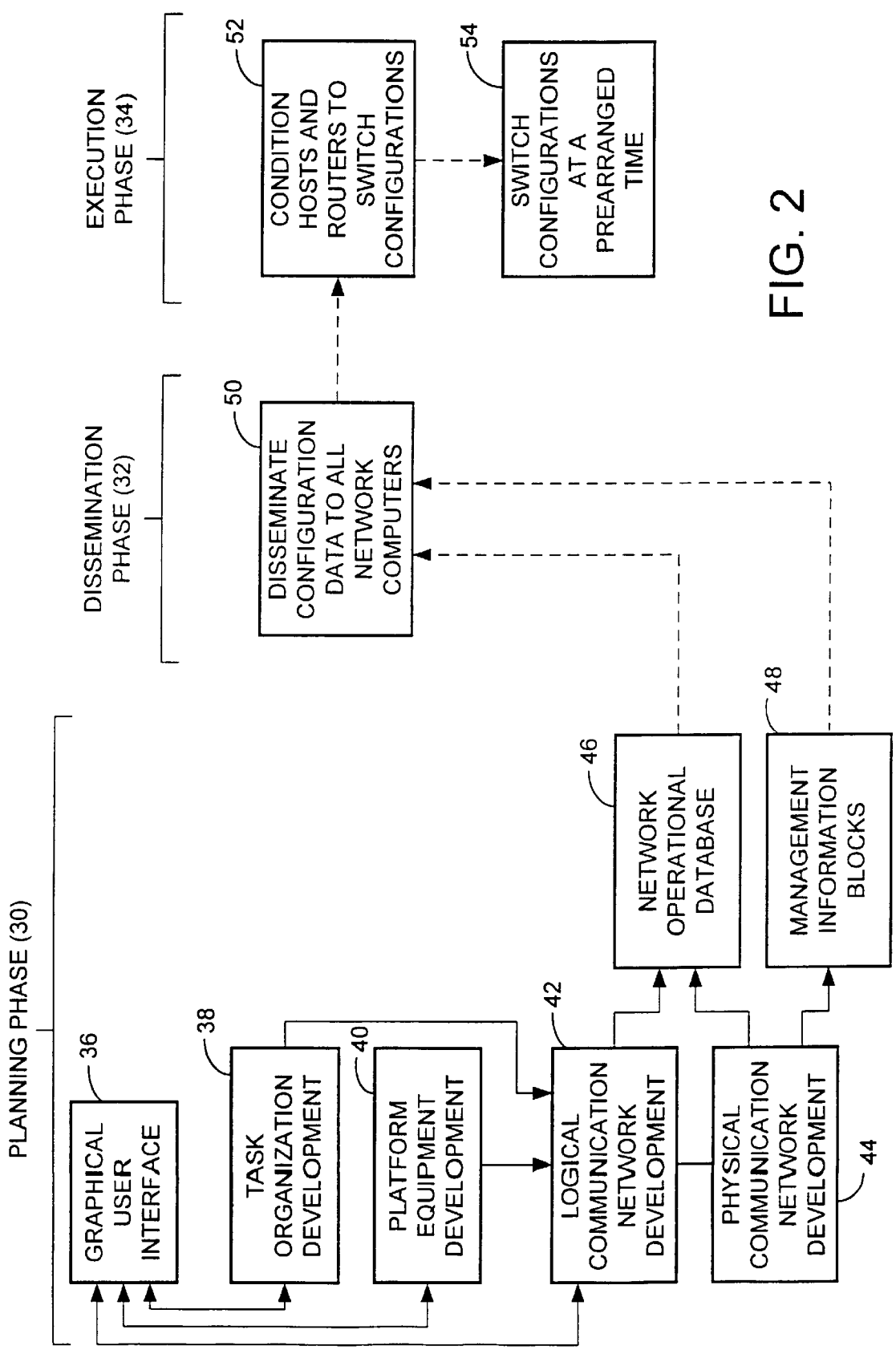
FIG. 2 is block diagram showing the principal functional modules of the network configuration tool in its planning phase, dissemination and execution phase of operation.

FIG. 2 shows the principal functions performed by the network configuration tool 10. The network configuration tool operates in three distinct phases: a planning phase 30, a dissemination phase 32 and an execution phase 34. In the planning phase, a graphical user interface 36 provides input data to three functional modules: a task organization development module 38, a platform equipment development module 40 and a logical communication network development module 42. Inherent in the operation of these three modules, although not shown in FIG. 2, is the input of other types of data discussed with reference to FIG. 1, including preloaded reference data 12, unit task organization rules and restrictions 14, and network parameters 16.

Figure 4:
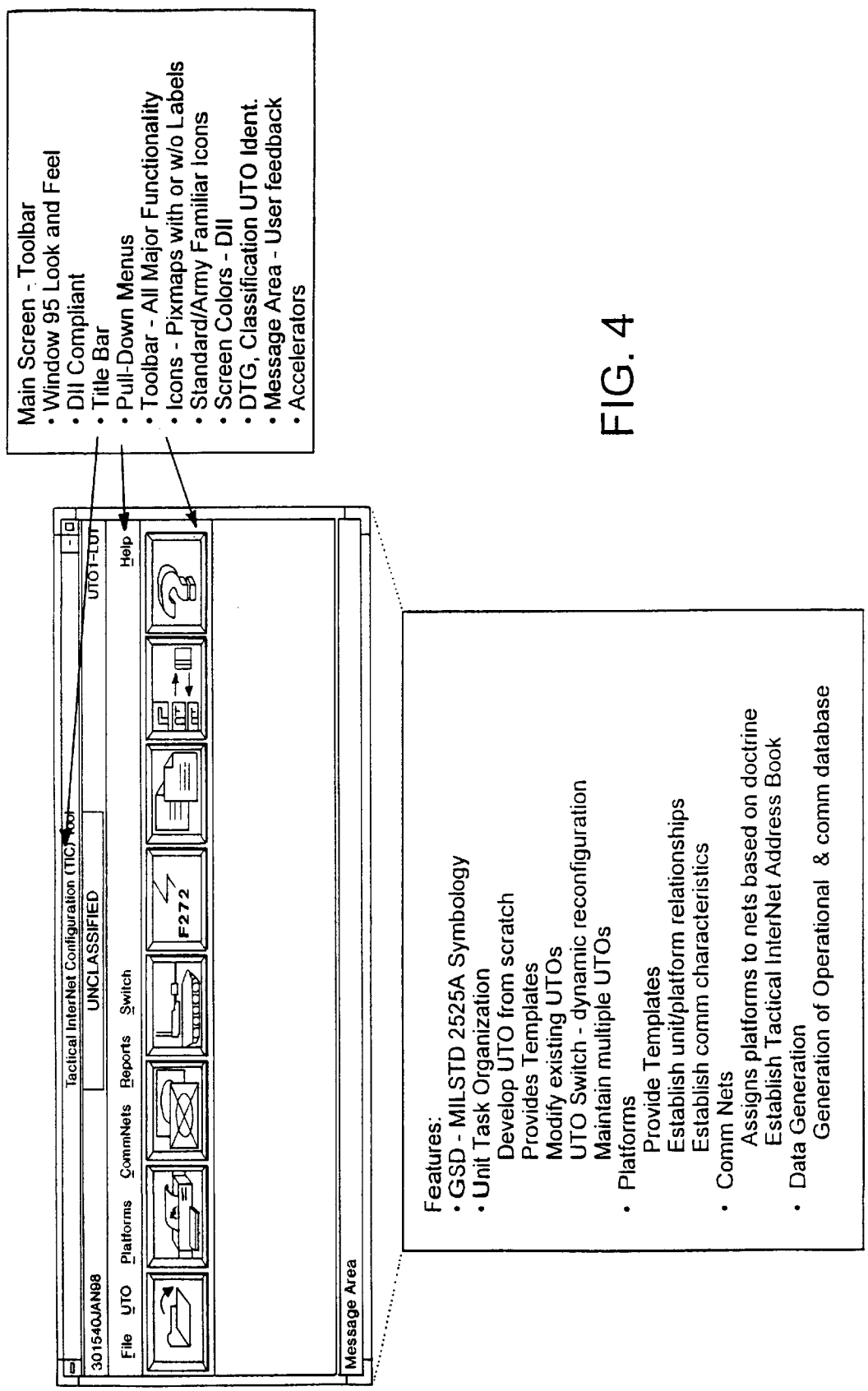
FIG. 4 is a screen image of user interface main menu in an implementation of the network configuration tool.
Figure 8:
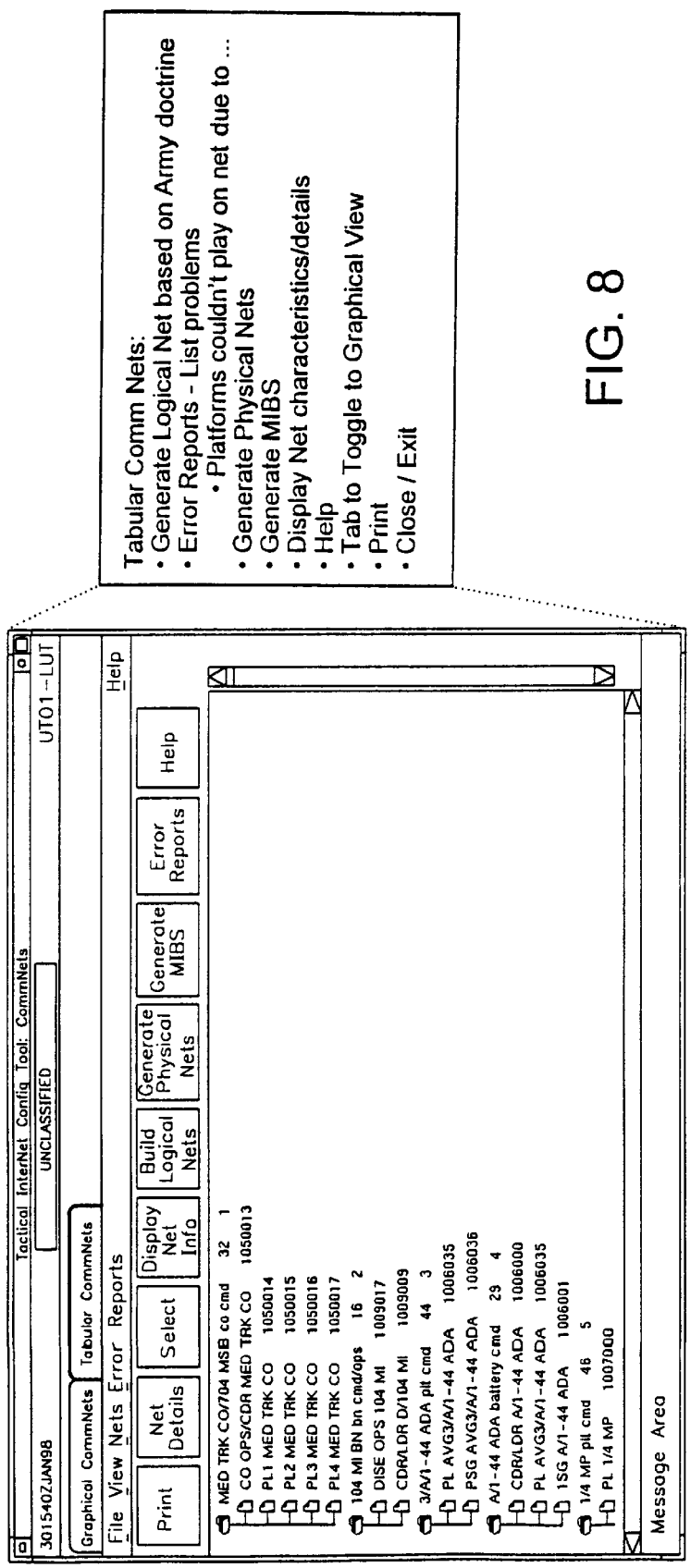
FIG. 8 is a screen image of a user interface defining logical communication nets in tabular form.
Figure 9B:
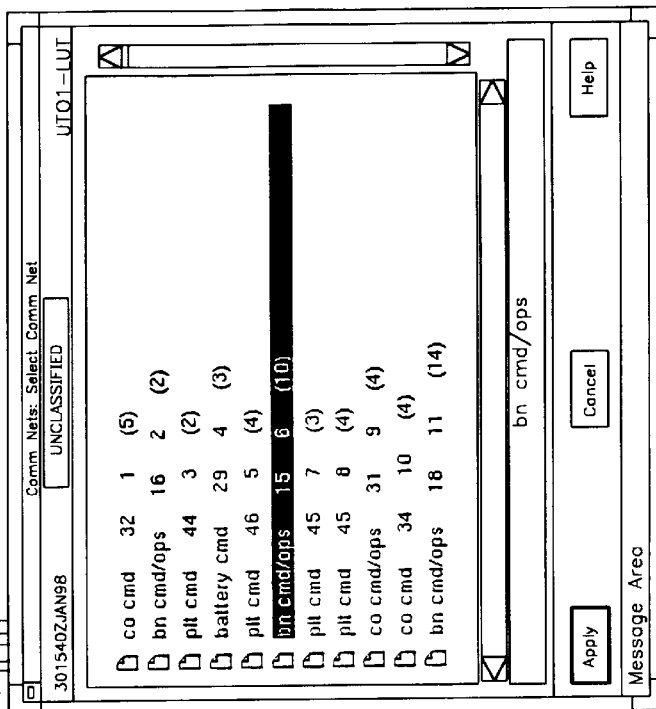
FIG. 9B is a screen image of a user interface showing communication net selection to obtain a display such as those in FIGS. 8 and 9A.
Figure 9A:
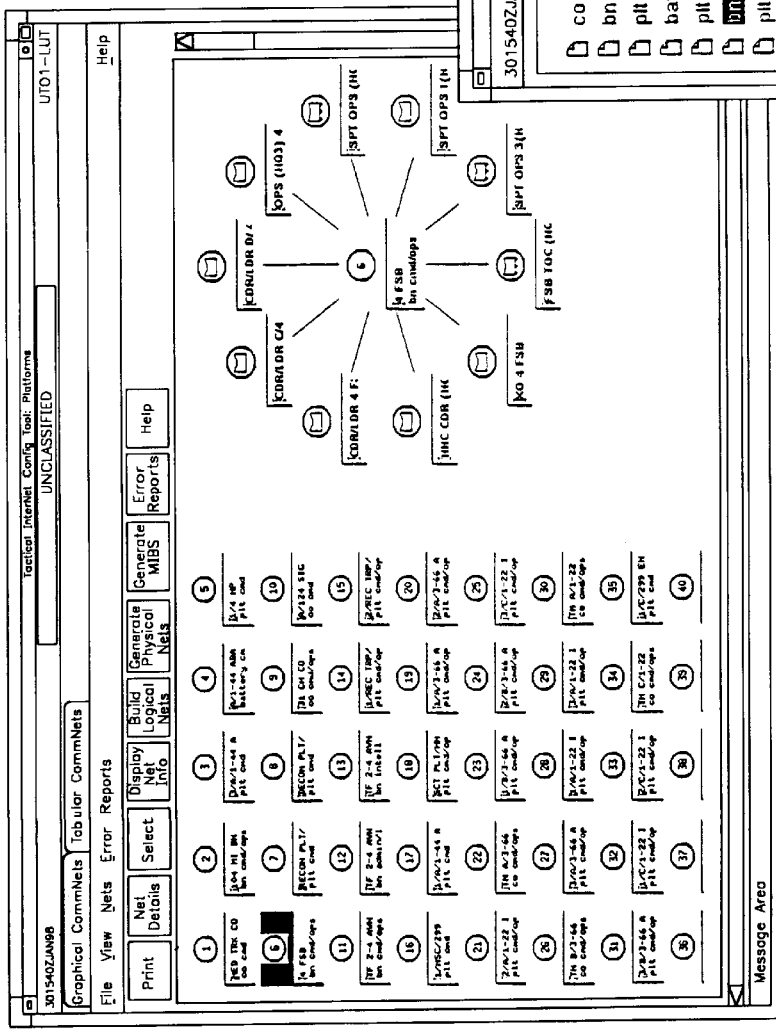
FIG. 9A is a screen image of a user interface defining logical communication nets in graphical.
Figure 10:
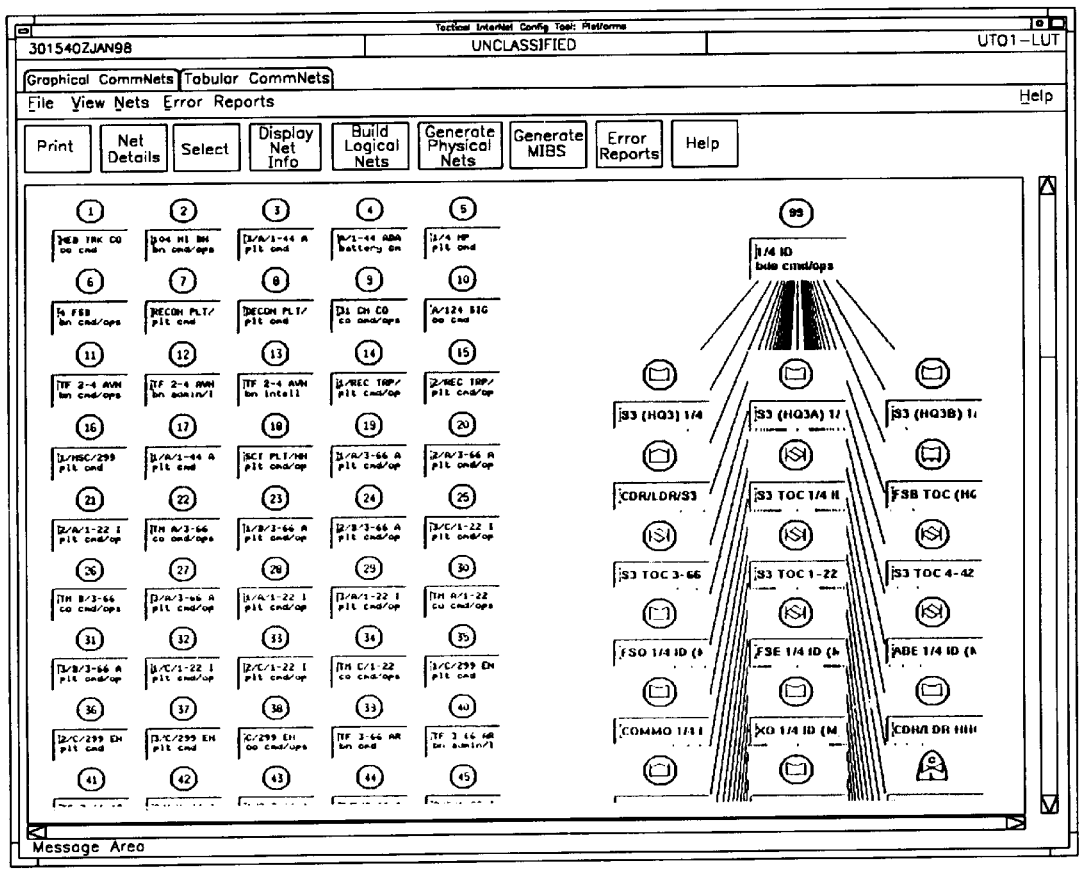
FIG. 10 is a screen image of a user interface similar to FIG. 9A, depicting communication nets in a different graphical form.

Task organization development is a process in which the user, through the graphical user interface 36, defines or modifies organizational relationships among entities that will be using the network being configured. The graphical interface 36 presents a display in an organization chart format, using names or familiar icons to represent the unit tasks. Central to the user interface 36 is a main menu, depicted in FIG. 4 and having pull-down menus and a "tool bar" of multiple function buttons. Each button uses an icon depicting a function to be performed. In the illustrated screen image, the icons are standard icons that are easily recognizable by personnel familiar with army terminology. As is customary, the purpose of each icon is further explained on the screen when a pointer is positioned over the icon. Network configurations that are contrary to the unit task rules and restrictions are not permitted and appropriate error messages are communicated to the user through the graphical interface 36. The interface 36 allows the user to define new task units and to move existing task units to new positions using a familiar "drag-and-drop" operation with a mouse or similar pointing device. The interface 36 also allows the user to switch between the graphical display and a tabular or "tree" format in which the unit tasks are displayed in a manner analogous to the way file names are displayed in a computer file management utility, showing the same hierarchy as the graphical display but in a more textual format. FIG. 8 shows how the network configuration tool of the invention displays logical communication nets in tabular for the user. FIG. 9A shows a corresponding graphical display of logical communication nets, while FIG. 9B shows a user screen display for selecting a logical net for graphical display. FIG. 10 is a communication net graphical display of a different type.

Figure 11:
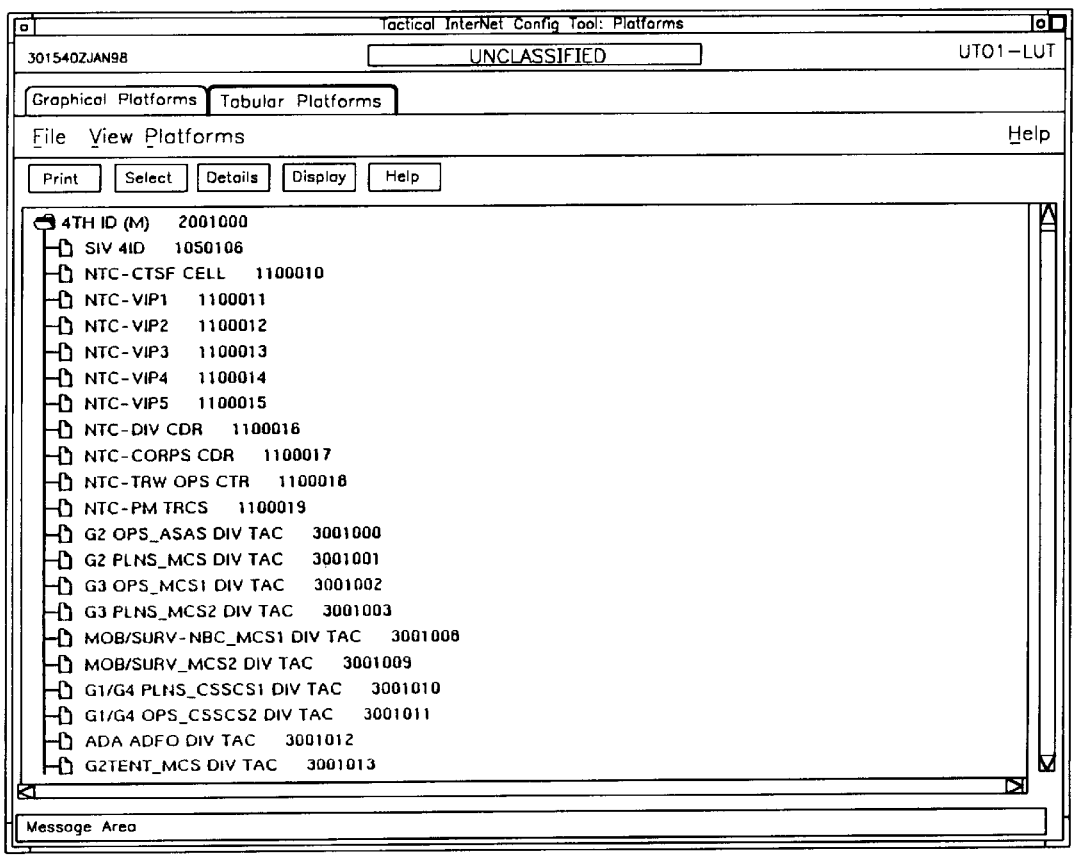
FIG. 11 is a screen image of a user interface, showing a tabular listing of network platforms (vehicles)
Figures 12A, 12B:
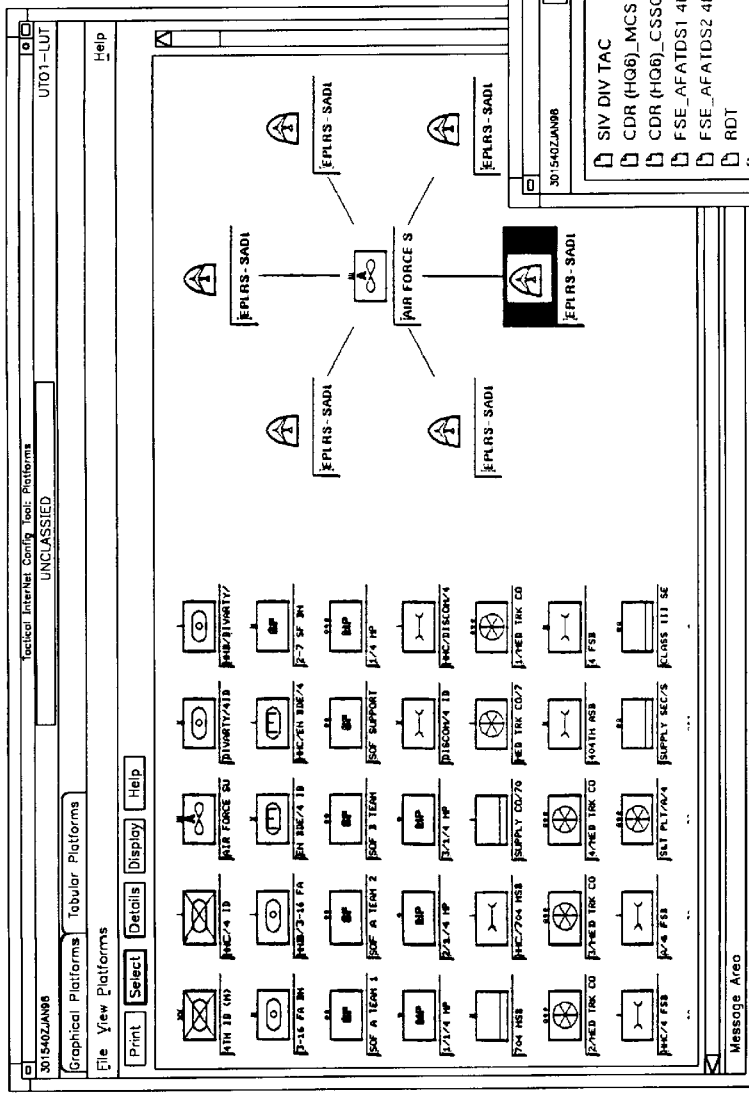
FIG. 12A is a screen image of a user interface depicting network platforms in graphical form.
FIG. 12B is a screen image of a user interface showing platform selection to obtain a display such as those in FIGS. 11 and 12A.
Figure 13:
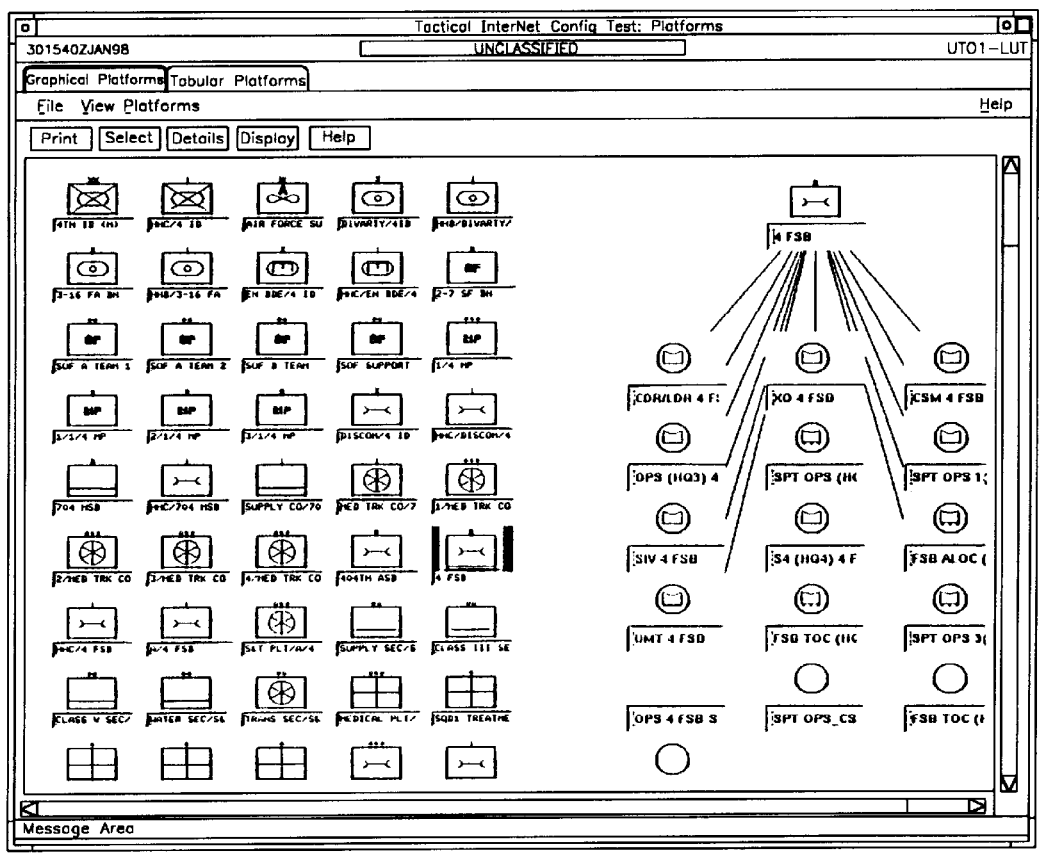
FIG. 13 is a screen image of a user interface similar to FIG. 12A, depicting network platforms in different graphical form.

The platform equipment development module 40 performs a similar function for the input and management of platform equipment data. The user interface screen shown in FIG. 11 shows in tabular form the platform equipment data. The screens of FIGS. 12A and 13 show the same information in graphical form, and FIG. 12B shows a platform selection screen. The authorized user can add definitions of new platform equipment and define, or redefine, the relationships between equipment identification numbers and task units or personnel that will using the equipment.

Figure 7:
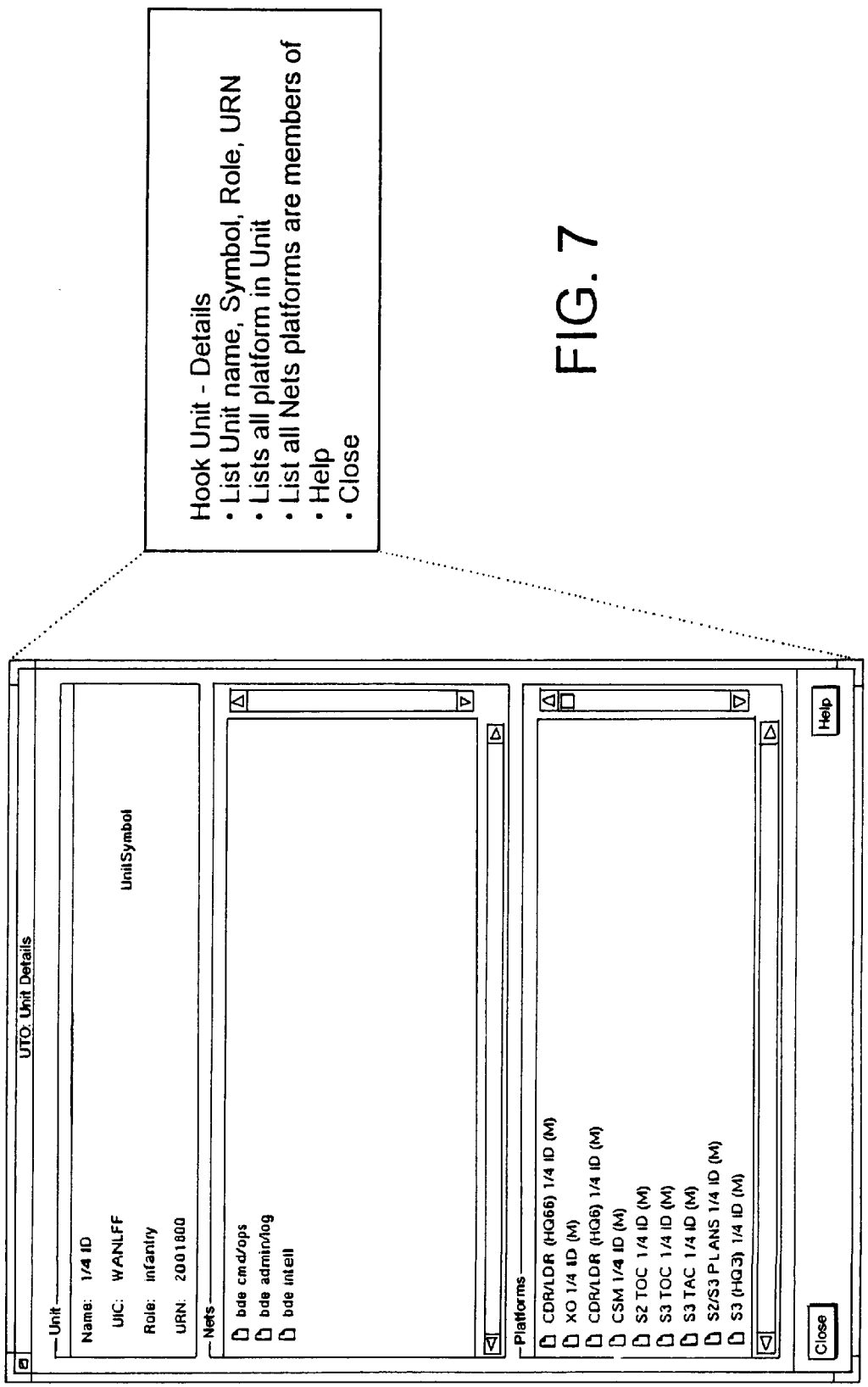
FIG. 7 is a screen image of a user interface defining a unit of the network.
Figure 14:
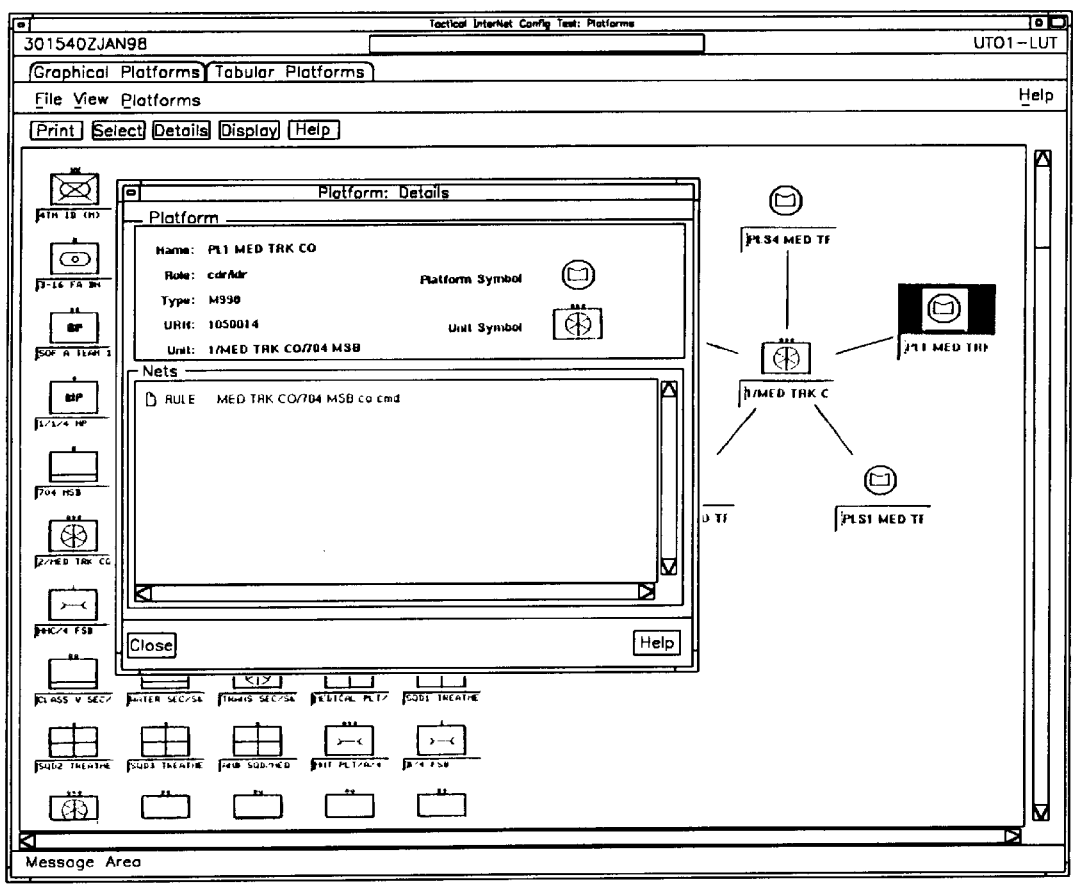
FIGS. 14 is a screen image of a user interface, defining a network unit in graphical form, and showing an overlaid screen image with details of a platform selected in the graphical display.

Once there is a task organization and a platform equipment organization in place, the user is ready to configure a logical network, using the logical communication network development module 42 through the graphical user interface 36. The user may establish one or more logical networks, or "nets," through which the various units or entities may communicate. Some units or users may be defined as belonging to more than one network. For example, net membership for an "operational" net may be based on the principal function performed by the net member in relation to the task organization. Assigning a task unit to one or more nets or to one or more platforms is facilitated by the user interface screen shown in FIG. 7. This screen lists the nets and platforms associated with a defined unit. The user interface screen shown in FIG. 14 allows the user to view platforms graphically and to display the details of a selected platform. Net membership of an operational net will generally closely follow the task organization configuration. All entities associated with a single manufacturing division will normally be members of a single net. Similarly, all the task units associated with a single military operation should be members of the same net. If the operation includes contributions from different branches of the armed services, the operational net may include units from these different branches.

Clearly, however, there is almost always a need for multiple overlapping nets based on various other membership criteria. In a business setting, for example, all of the financial personnel in various operational divisions and branches may have a need to communicate directly with each other and with a corporate treasurer or chief financial officer. Similarly, groups of upper management personnel may have a need for a separate communication net. In a military setting, there is also usually a need for communication in overlapping nets distinct from an operational net pertaining to a current military operation. Units responsible for food distribution, for example, need to communicate with each other outside the confines of the operational net. Higher ranking officers may also have a need for an independent communication net.

The function of the logical communication network development module 42 is to permit the authorized user to make configuration changes and additions to the logical communication nets. With this module, the user can define new networks and assign members to those networks. The network configuration tool 10 then converts the logical networks developed in module 42 to physical networks, using a physical communication network development module 44. This module uses all input data pertaining to the network and the desired logical networks, to derive corresponding physical network parameters. Data defining both the logical and physical networks are combined to form a complete network operational database 46. The physical communication network development module 44 also generates management information blocks, as indicated at 48.

In the dissemination phase 32, data from the network operational database 46 are transmitted to the network computers, as indicated in block 50, together with management information blocks 48. Transmission is made in a standard format recognizable by computers in the network, such as the simple network management protocol (SNMP). SNMP was designed to facilitate monitoring of network bridges and routers, but the same protocol is used in the present invention to control and program bridges and routers in accordance with a new configuration.

During dissemination, the networks are still functioning in their prior configurations. In the execution phase 34, the disseminated data are used to condition the network computers, including hosts and routers, to switch configurations at a prearranged time, as indicated in block 52, or upon receipt of a command transmitted over the network. When the command is received, or when the time to switch configurations arrives, the network computers together switch to their new configurations, as indicated in block 54. The new configurations remain effective until the next configuration change is made.

Figure 3B:
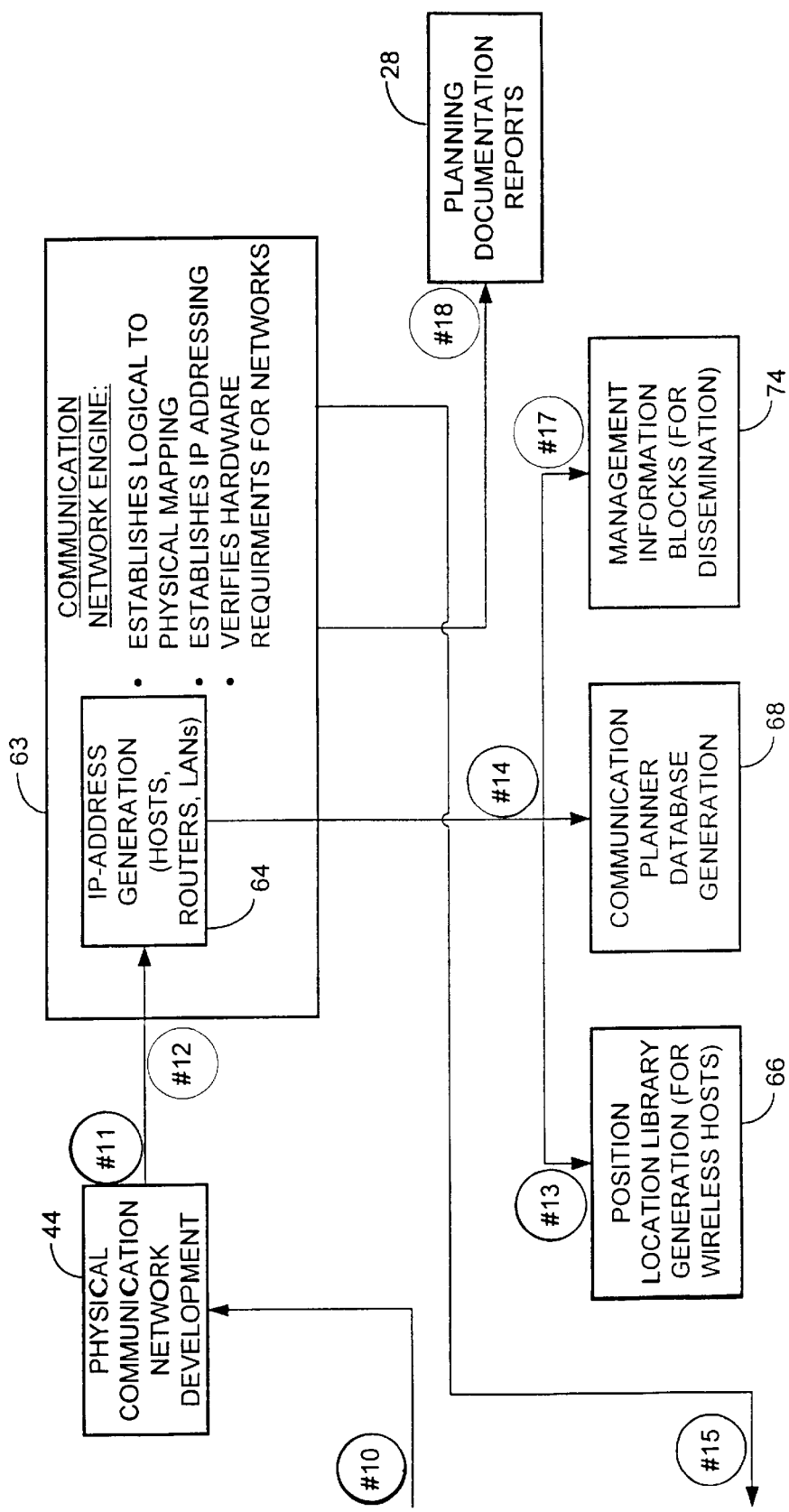
Figure 5:
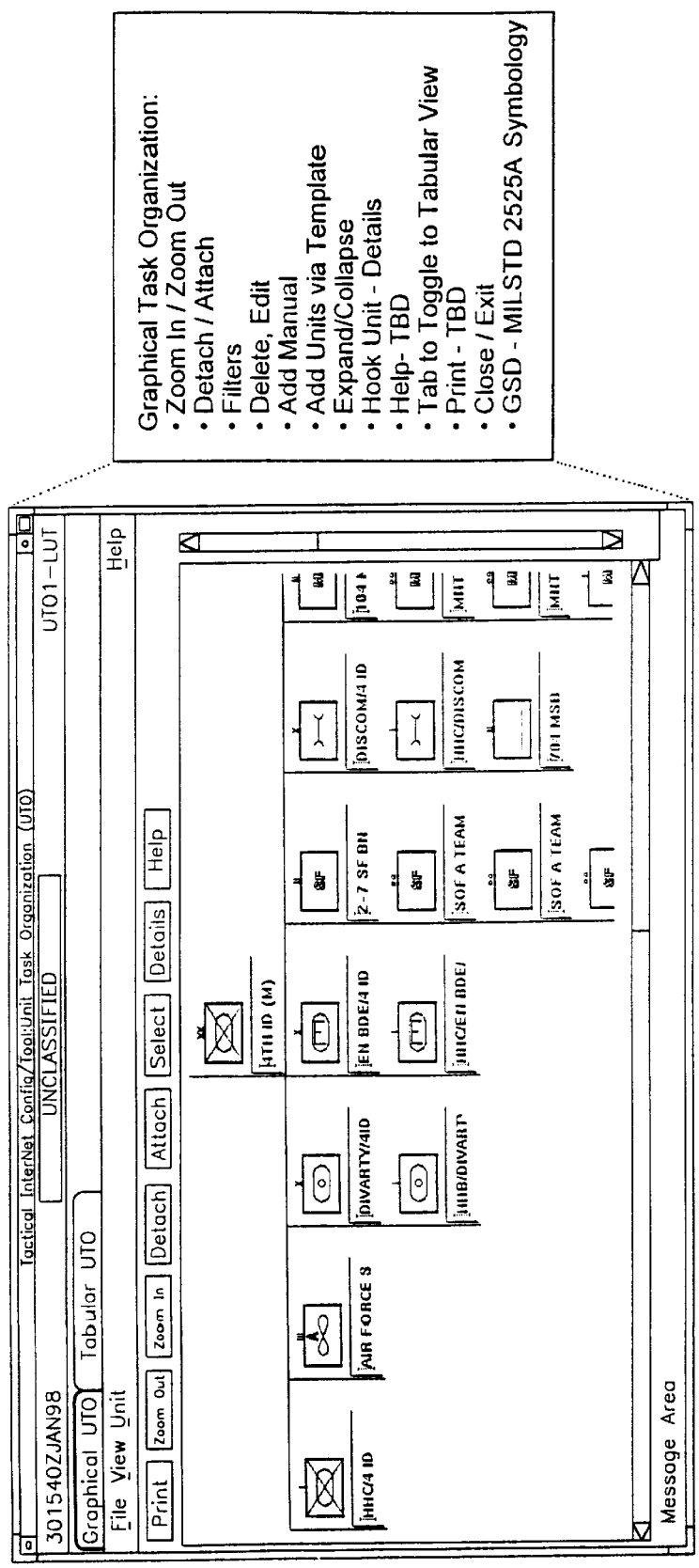
FIG. 5 is a screen image of a user interface for graphical task organization in the network configuration tool.
Figure 6:
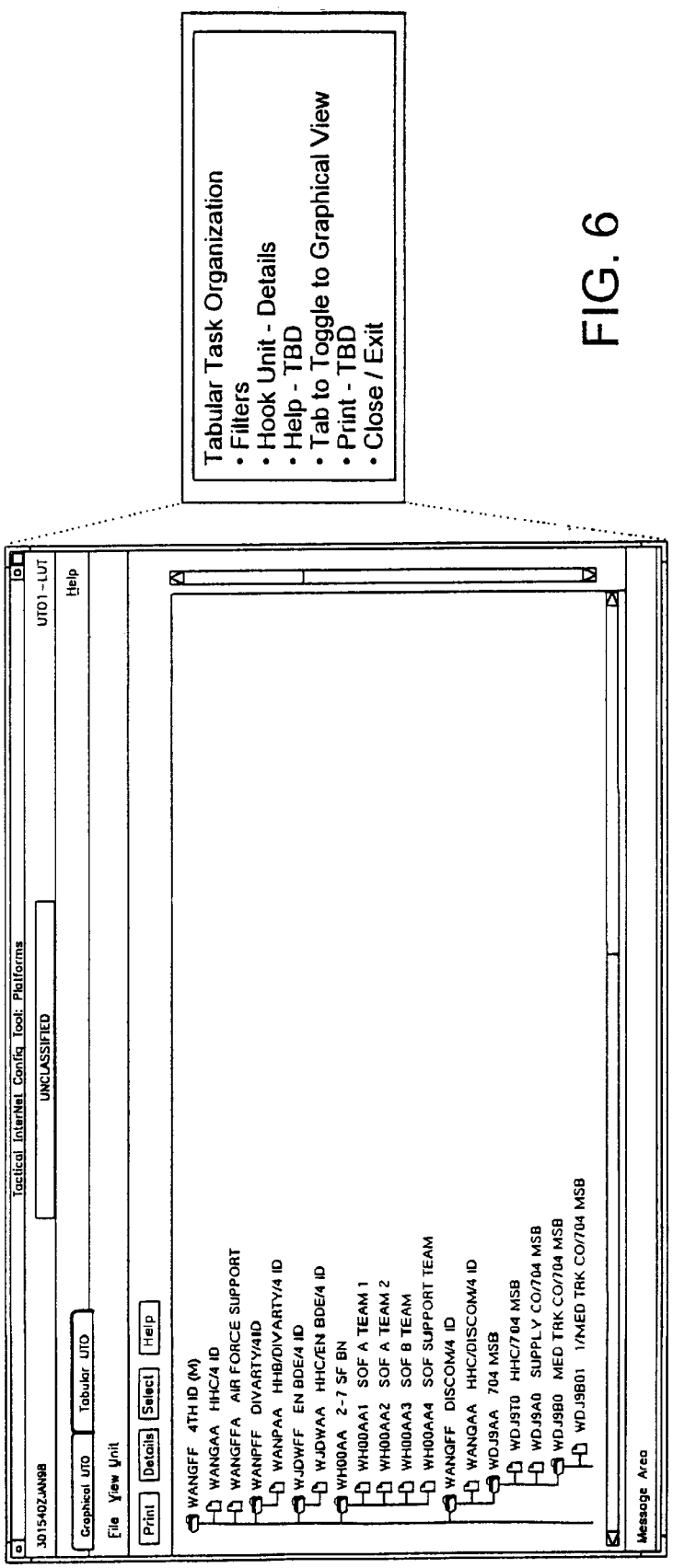
FIG. 6 is a screen image similar to FIG. 5 but showing tabular task organization.

FIG. 3, which comprises FIG. 3A and 3B, shows a process flow sequence through various processing modules of the network configuration engine 10 (FIG. 1) operating in the planning phase of operation. The numerals in circles, #1, #2, #3 and so forth, indicate the approximate processing sequence in the planning phase. As indicated by processing sequence numeral #1, the planning process begins with the task organization development module 38, which establishes a unit task organization (UTO) identification, a unit identification in the form of a name, parent and subordinate identifications, and a definition of the unit's function or role. Unit task organization is mechanized as much as possible by tools that operate in conjunction with the graphical user interface 36. In addition to using icons that represent the units and may be "dragged and dropped" to new locations, the interface facilitates adding new units by providing a unit "template" into which the user merely enters or modifies the appropriate unit parameters. This process employs a user interface screen similar to the one shown in FIG. 5, in which various unit tasks are depicted by icons arranged in an organization matrix, with interconnecting lines indicating the relationships of the tasks. For convenience, the same task organization may be depicted, at the user's option, in tabular form, as indicated in FIG. 6.

As indicated by sequence #2, the task organization development module 38 communicates with an Internet address book development module 60, which maintains a directory of unit reference numbers (URNs). Each unit in a network has a unique URN. The Internet address book development module 60 may also establish multicast and broadcast URNs as the information becomes available.

As indicated by sequence #3, the task organization development module 38 also communicates with the graphical user interface 36 and with the platform equipment development module 40, as depicted in FIGS. 11, 12A, 12B and 13. The latter module 40 establishes a relationship between each unit and the platform on which it functions. The platform is further defined by platform identification, platform type, equipment set identification, equipment elements and the type of unit, such as router, host, radio and so forth. Some of this information is shared with the Internet address book development module 60, as indicated by sequence #4, and there is communication with the graphical user interface 36, as indicated by sequence #5.

The task organization development module 38 also communicates with the logical communication network development module 42, as indicated by sequence #6. The functions of this module include establishing a net identification for each operational net that is defined, establishing each unit's relationship to the operational net, and establishing net membership based on various criteria, using various user interface screens, such as those depicted in FIGS. 8, 9A, 9B and 10. Some of this information is used by the Internet address book development program 60, as indicated by sequence #7, and other information is used by a communication planner database generation module 62, as indicated by sequence #8.

The logical communication network development module 42 also communicates with the graphical user interface 36, as indicated by sequence #9, and communicates, as indicated by sequence #10, with the physical communication network development module 44, shown in FIG. 3B. As previously discussed, this module establishes physical nets based on available hardware and on the desired logical net definitions received from the logical communications network development module 42, as indicated by sequence #11. The physical communications network development module 44 sends data, as indicated by sequence #12, to a communication network engine 63, which establishes logical to physical mapping of the networks, establishes Internet protocol (IP) addressing, and verifies hardware requirements for the networks. The communication engine 62 has an IP-address generation module 64, which provides address data to a position location library generation module 66, as indicated by sequence #13, and to a communication planner database generation module 68, as indicated by sequence #14, which stores physical network data in the communication planner database. The engine 63 also generates an error reporting signal, as indicated at sequence #15, which is coupled back to an error reporting module 26 in FIG. 3A. Any errors reported are reflected in the communications planner database, as indicated by sequence #16.

Steps indicated by sequence #1 through sequence #16 are repeated iteratively until there are no longer any errors to report back. An additional step of operational database generation, indicated in block 72, combines all the database updates made by the communications planner database generation blocks 62 and 68. Finally, as indicated by sequence #17 and #18, respectively, management information blocks are generated, as indicated in block 74, and planning documentation reports are generated, as indicated in block 28.

Figure 15:
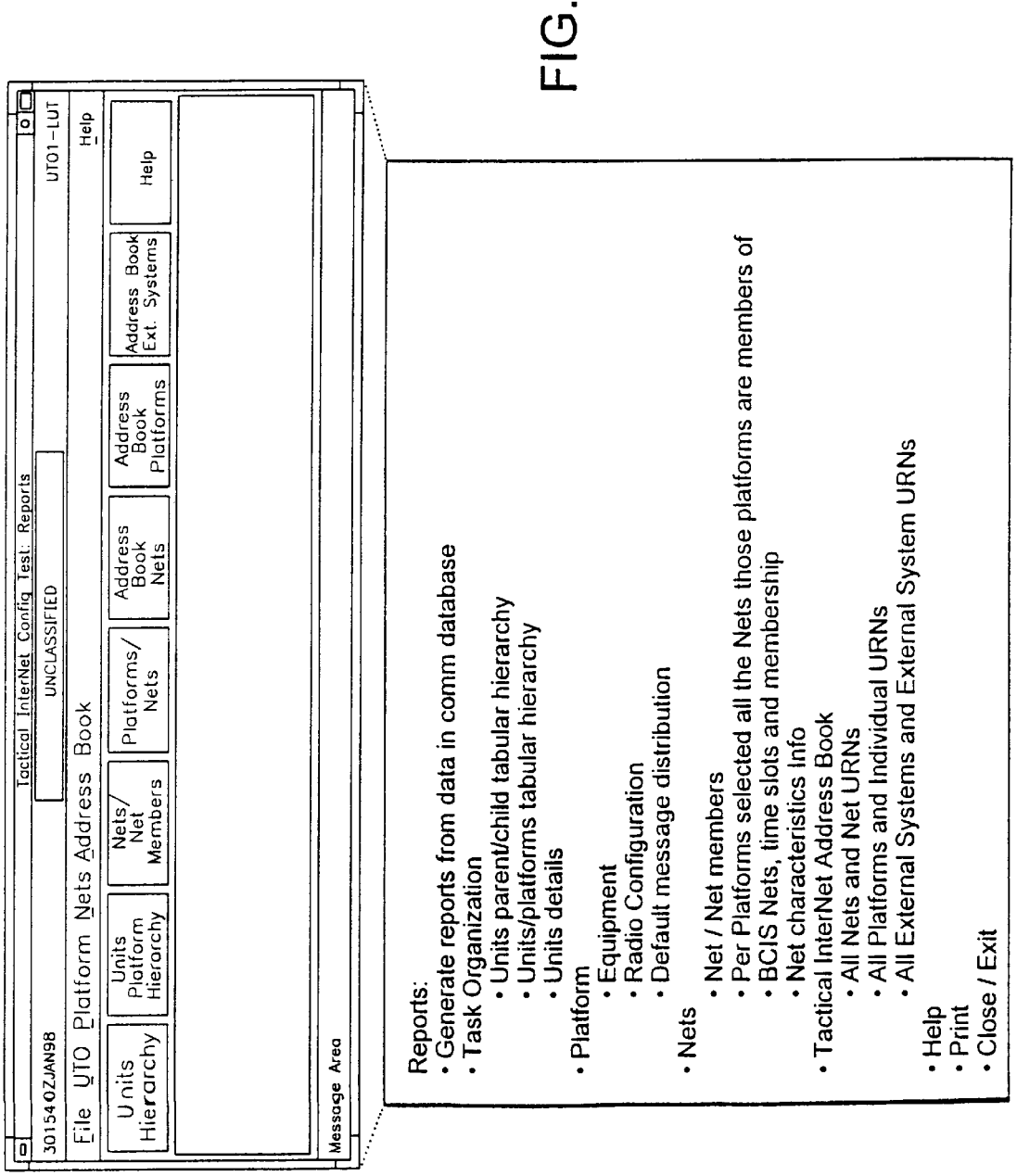
FIG. 15 is a screen image of a user interface showing a main report generating menu.
Figure 16B:
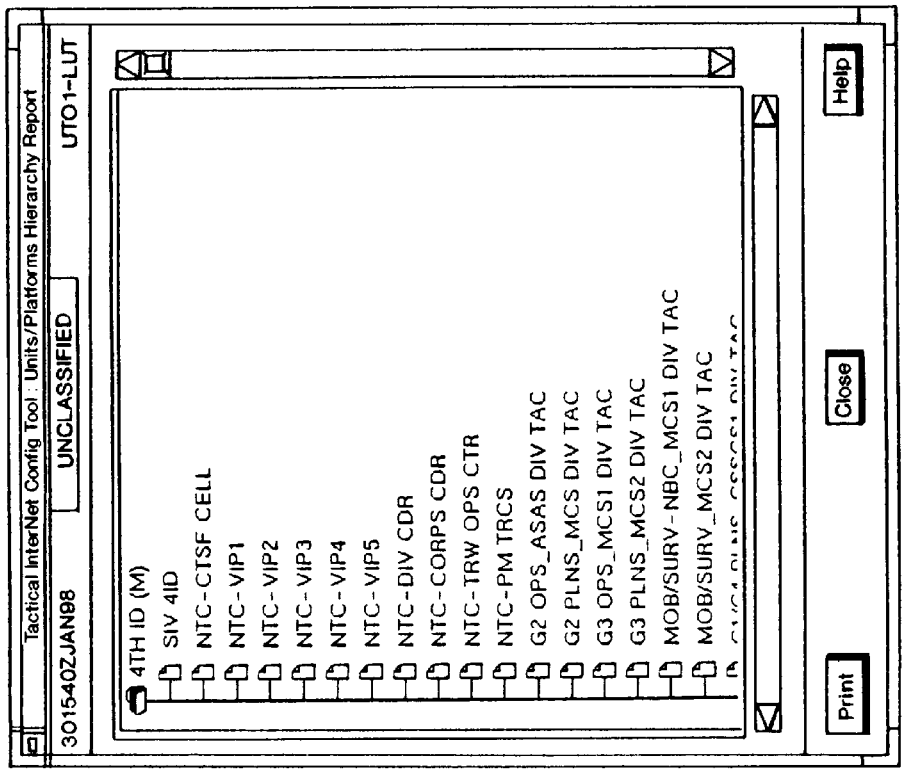
FIGS. 16A and 16B are screen images of a user interface showing a units hierarchy report and a units/platforms hierarchy report, respectively.
Figure 16A:
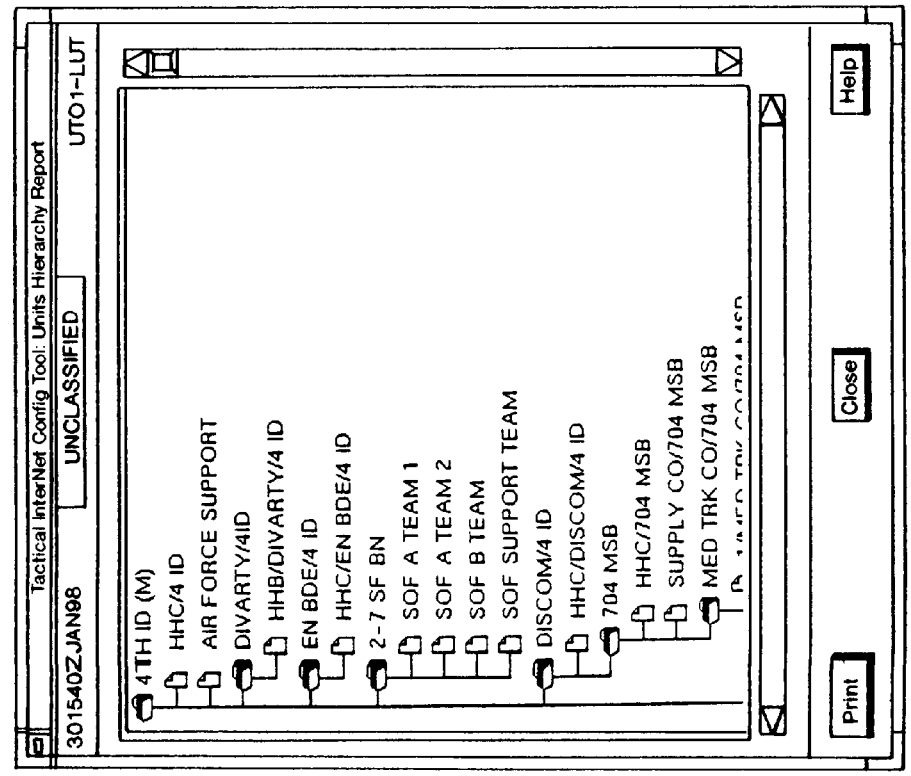
Figures 17A, 17B:
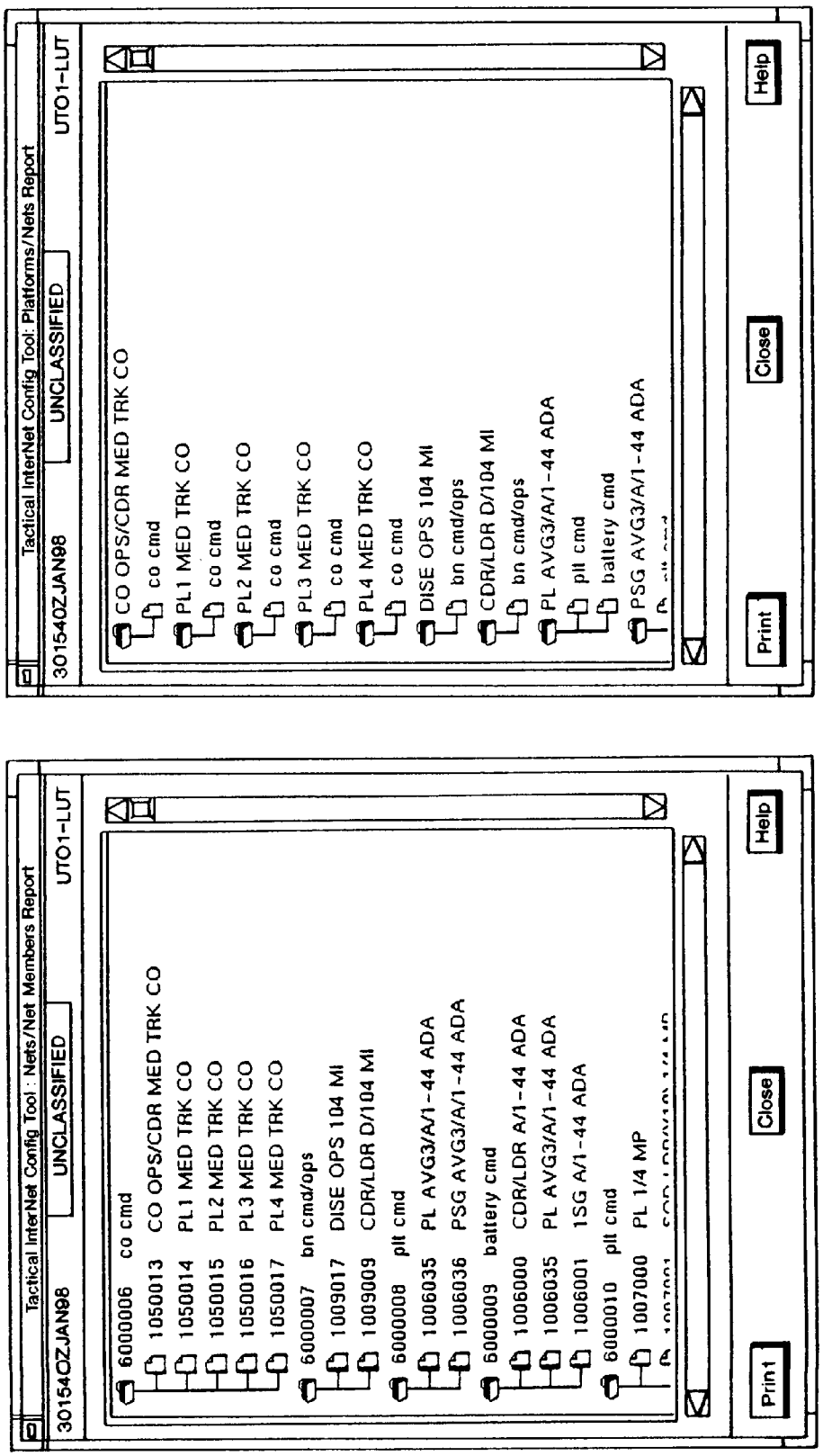
FIGS. 17A and 17B are screen images of a user interface showing a nets/net members report and a platforms/nets report, respectively.
Figure 18B:
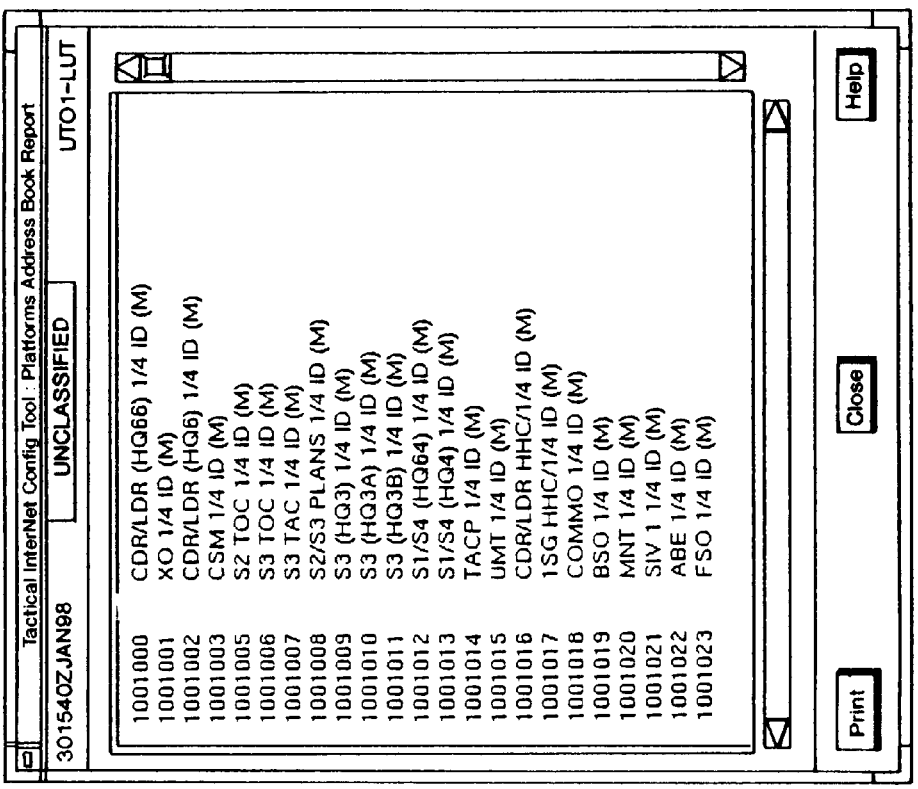
FIGS. 18A and 18B are screen images of a user interface showing address books of nets and platforms, respectively.
Figure 18A:
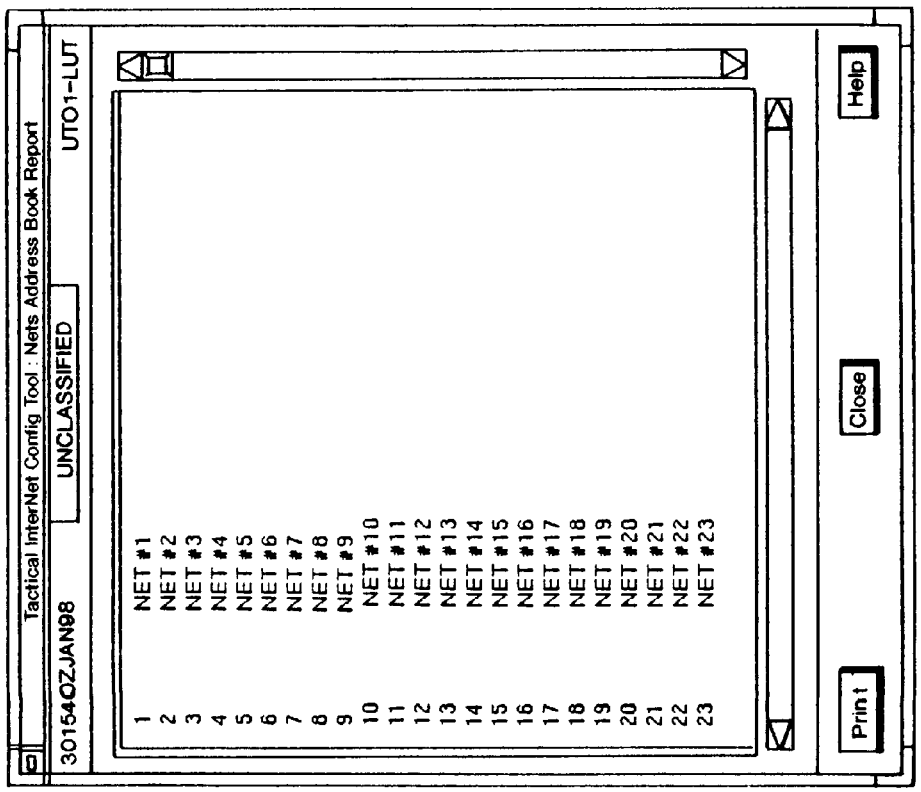

The network configuration tool of the present invention also generates various reports as selected by the user. As shown in the user interface screen of FIG. 15, the reports cover task organization, platforms, communication nets and address books. By way of example, FIGS. 16A and 16B depict a units hierarchy report and a units/platforms hierarchy report. FIGS. 17A and 17B depict a nets/net members report and a platforms/nets report. Finally, FIGS. 18A and 18B depict an address book for nets and an address book for platforms.

It will be appreciated from the foregoing that the present invention represents a significant advance in the field of communication networks. In particular, the invention provides a technique for automating the process of reconfiguration of networks, thereby permitting networks to be reconfigured very much more rapidly than by using conventional manual techniques. It will also be appreciated that, although a specific embodiment of the invention has been illustrated and described, various modifications may be made without departing from the spirit and scope of the invention.

Accordingly, the invention should not be limited except as by the appended claims.

What is claimed is:

1. A system for configuring a communication network of multiple interconnected computers, some of which perform a message routing function, the system comprising:

a graphical user interface module facilitating specification of a network by an authorized user;

a network planning module, coupled to the graphical user interface module and functioning to allow the authorized user to define various aspects of a network of computers;

means for generating network programming data corresponding to a new configuration specified in the network planning module;

means for disseminating the network programming data over an existing communication network;

means for conditioning computers in the network to switch to the new configuration on the occurrence of a triggering signal; and means for switching to the new configuration upon occurrence of the triggering signal;

wherein the network planning module includes
a task organization development module coupled to the graphical user interface and functioning to allow the authorized user to define functional interrelationships between users of network computer stations,
a platform equipment development module coupled to the graphical user interface and functioning to allow the authorized user to define equipment parameters for each network computer station,
a logical communication network development module coupled to the graphical user interface and functioning to allow the authorized user to specify at least one logical network configuration that defines the interrelationships between network computer stations, means for automatically converting the at least one logical network configuration to at least one corresponding physical network configuration, and means for automatically generating from the at least one physical network configuration a network operational database that completely defines the network and a plurality of management information blocks containing data to be used to program message routing computers in the network.

2. A system as defined in claim 1, wherein:

the triggering signal is generated by a clock in each computer and the means for conditioning conditions the network computers to switch to the new configuration at a prearranged time.

3. A system as defined in claim 1, wherein:

the means for switching includes means for generating a triggering signal that is transmitted to the network computers over the network.

4. A system as defined in claim 1, wherein the means for disseminating includes:

means for transmitting the management information blocks over the network to message routing computers to which the blocks pertain.

5. A system as defined in claim 1, wherein the means for conditioning is located in each message routing computer and operates in response to receipt of a management information block.

6. A system as defined in claim 1, and further comprising:

means for generating reports pertaining to the task organization, platform equipment, and logical network configuration defined in the development modules, and pertaining to the means for automatically generating a physical network configuration.

7. A system as defined in claim 1, wherein the network planning module further includes an Internet address book development module using data generated in the task organization development module, the platform equipment development module and the logical communication network development module.

8. A system as defined in claim 1, wherein the network planning module further includes:

means for automatically detecting any errors made in the development modules;

means for reporting any detected errors; and means for repeatedly operating the development modules until any detected and reported errors are eliminated.

9. A method for configuring a communication network of multiple interconnected computers, some of which perform a message muting function, the method comprising the steps of:

planning a network configuration in simulated form through a graphical user interface;

generating network programming data corresponding to a new configuration specified in the planning step;

disseminating the network programming data over an existing communication network;

conditioning computers in the network to switch to the new configuration on the occurrence of a triggering signal; and switching to the new configuration upon occurrence of the triggering signal;

wherein the planning step includes specifying a task organization that defines functional interrelationships between users of network computer stations, specifying a platform equipment definition for each network computer station, specifying at least one logical network configuration that defines the interrelationships between network computer stations, automatically converting the at least one logical network configuration to at least one corresponding physical network configuration, and automatically generating from the at least one physical network configuration a network operational database that completely defines the network and a plurality of management information blocks containing data to be used to program message routing computers in the network.

10. A method as defined in claim 9, wherein:

the triggering signal is generated by a clock in each computer and the conditioning step conditions the network computers to switch to the new configuration at a prearranged time.

11. A method as defined in claim 9, wherein:

the triggering signal is generated by a command transmitted to the network computers over the network.

12. A method as defined in claim 9, wherein the disseminating step includes:

transmitting the management information blocks over the network to message routing computers to which the blocks pertain.

13. A method as defined in claim 9, wherein the conditioning step is performed in each message routing computer in response to receipt of a management information block.

14. A method as defined in claim 9, and further comprising the step of:

generating reports pertaining to the task organization, platform equipment, and logical network configuration defined in the specifying steps, and pertaining to the physical network configuration.

15. A method as defined in claim 9, wherein the planning step further includes developing an Internet address book from the data generated during the specifying steps.

16. A method as defined in claim 9, wherein the planning step further includes:

automatically detecting any errors made in the specifying steps;

reporting any detected errors; and repeating the specifying steps until any detected and reported errors are eliminated.

* * * * *